Oct. 15, 1929.   L. A. PARADISE   1,731,434
HARVESTER FINGER BAR
Filed Feb. 23, 1927
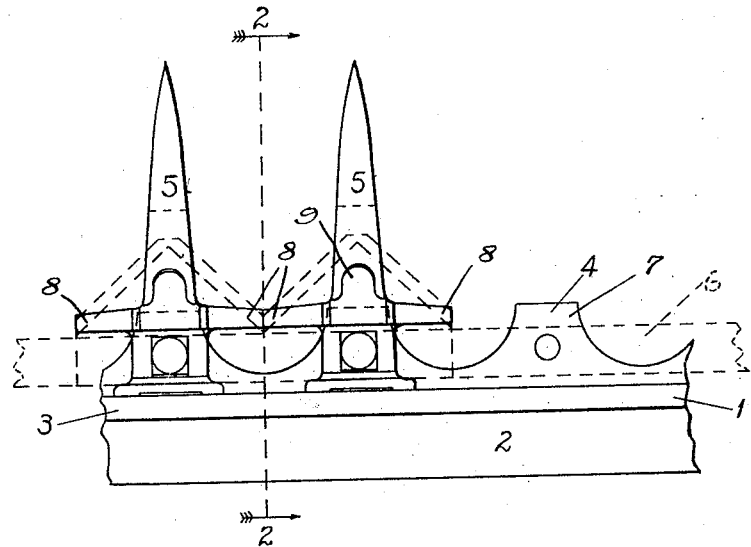
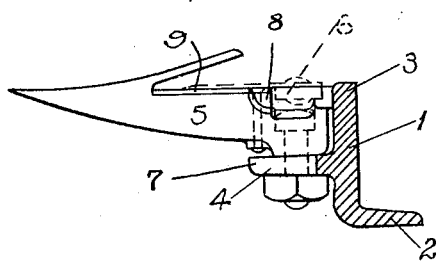

Patented Oct. 15, 1929

1,731,434

UNITED STATES PATENT OFFICE

LOUIS A. PARADISE, OF MOLINE, ILLINOIS, ASSIGNOR TO DEERE & COMPANY, OF MOLINE, ILLINOIS, A CORPORATION OF ILLINOIS

HARVESTER FINGER BAR

Application filed February 23, 1927. Serial No. 170,080.

My invention relates to the cutting mechanism of harvesting machines, and has for its object improvement of the finger bar to prevent clogging during operation in the harvest, other objects being disclosed in the following specification:

Referring to the drawings in which similar numerals indicate identical parts:

Figure 1 is a plan view of part of my improved finger bar, and

Figure 2 is a section on the line 2—2 of Figure 1.

The finger bar 1 is made, preferably, of an unequal angle bar having its shorter leg 2 as a base, and its longer leg 3 vertically disposed. Intermediate the height of the leg 3 and extending longitudinally and forwardly on the bar is a flange 4 to which are bolted guard fingers 5 held in rigid contact with the upper face of the flange and the front of the leg 3 of the bar. The knife bar 6 is shown in dotted lines in Figures 1 and 2.

I cut from the flange 4 semi-circular portions leaving between them forwardly extending points 7 to the upper side of which the guard fingers 5 are secured. The guard fingers are of the usual type having horns 8 projecting from each side which are in close contact with similar horns on adjacent guard fingers. The ledger plates 9 are inset, as usual, with their wearing surface approximately flush with the upper surface of the horns 8 so as to present a continuous smooth surface over which the knife bar 6 operates; this surface, as shown, is substantially in the same horizontal plane as the upper edge of the vertical leg 3 of the bar 1.

Now if the flange 4, which is so located on the flange 3 of the bar as to be well above contact with the ground and to which the guard fingers are secured, had an unbroken surface from end to end, it will be readily apparent that pockets would be formed between the guard fingers having the flange 4 as one side, the knife bar as the top and the vertical leg 3, of the bar 1, as the rear; these pockets would be open in front, however, in which soil would accumulate and pack, seriously affecting the cutting action and materially increasing wear of the parts. By cutting away the flange 4, between the guard fingers the lower side of the pockets is removed and soil or other matter will drop to the ground, so that liability of an accumulation to clog the parts of the mechanism described will be avoided.

What I claim is—

1. A harvester finger bar having a vertical leg, a horizontally disposed flange extending forwardly from said leg intermediate the height thereof, said flange being cut away at spaced intervals to form forwardly extending points.

2. A harvester finger bar having a vertical and a horizontal leg, a horizontally disposed flange extending forwardly from the vertical leg above the horizontal leg, said flange being cut away at spaced intervals to form forwardly extending points.

3. A harvester finger bar having a vertical leg, a horizontally disposed flange extending forwardly from said leg intermediate the height thereof, and guard fingers secured to the upper side of said flange, said flange having portions of its width cut away between the guard fingers.

LOUIS A. PARADISE.